United States Patent
Ackerly

(10) Patent No.: US 9,710,659 B2
(45) Date of Patent: Jul. 18, 2017

(54) METHODS AND SYSTEMS FOR ENFORCING, BY A KERNEL DRIVER, A USAGE RESTRICTION ASSOCIATED WITH ENCRYPTED DATA

(71) Applicant: VirTru Corporation, Washington, DC (US)

(72) Inventor: William R. Ackerly, Washington, DC (US)

(73) Assignee: Virtru Corporation, Washington, DC (US)

( * ) Notice: Subject to any disclaimer, the term of this patent is extended or adjusted under 35 U.S.C. 154(b) by 146 days.

(21) Appl. No.: 14/834,461

(22) Filed: Aug. 25, 2015

(65) Prior Publication Data
US 2016/0063258 A1   Mar. 3, 2016

Related U.S. Application Data

(60) Provisional application No. 62/042,968, filed on Aug. 28, 2014.

(51) Int. Cl.
  *G06F 21/00*    (2013.01)
  *G06F 21/60*    (2013.01)
  (Continued)

(52) U.S. Cl.
  CPC ............ *G06F 21/602* (2013.01); *G06F 9/468* (2013.01); *G06F 21/6281* (2013.01);
  (Continued)

(58) Field of Classification Search
  None
  See application file for complete search history.

(56) References Cited

U.S. PATENT DOCUMENTS 7,698,744 B2 *  4/2010  Fanton ................... G06F 21/10
                                                713/150
2003/0033303 A1   2/2003  Collins
                        (Continued)

FOREIGN PATENT DOCUMENTS

WO   2012016091 A2   2/2012

OTHER PUBLICATIONS

International Search Report and Written Opinion issued in connection with PCT/US2015/046981, dated Dec. 7, 2015, 7 pages.

*Primary Examiner* — Shin-Hon Chen
(74) *Attorney, Agent, or Firm* — Blueshift IP, LLC; Cynthia M. Gilbert, Esq.

(57)  ABSTRACT

A method of providing a restricted set of application programming interfaces includes decrypting, by a secure object information reader executing on a computing device, an encrypted data object using information associated with the encrypted data object to generate a decrypted data object, the information received from an access control management system. The method includes intercepting, by a kernel driver executing on the computing device, from a process executing on the computing device, a request to access the decrypted data object. The method includes identifying, by the kernel driver, using the information associated with the encrypted data object, a usage requirement restricting a set of operations available to the process in accessing the decrypted data object. The method includes providing, by the kernel driver, to the process, a restricted set of application programming interfaces with which to interact with the decrypted data object, as permitted by the restricted set of operations.

4 Claims, 8 Drawing Sheets

(51) Int. Cl.
*G06F 21/62* (2013.01)
*H04L 29/06* (2006.01)
*G06F 9/46* (2006.01)
G06F 11/30 (2006.01)
G06F 12/14 (2006.01)
G06F 7/04 (2006.01)
G06F 17/30 (2006.01)

(52) U.S. Cl.
CPC .. *H04L 63/0428* (2013.01); *G06F 2221/2107* (2013.01); *G06F 2221/2141* (2013.01); *H04L 63/0892* (2013.01); *H04L 2463/101* (2013.01)

(56) References Cited

U.S. PATENT DOCUMENTS

| | | |
|---|---|---|
| 2003/0105734 A1 | 6/2003 | Hitchen et al. |
| 2006/0206937 A1* | 9/2006 | Repasi .................... G06F 21/52 726/22 |
| 2007/0250927 A1* | 10/2007 | Naik ..................... G06F 21/566 726/22 |
| 2008/0016339 A1* | 1/2008 | Shukla .................... G06F 21/53 713/164 |
| 2010/0299759 A1* | 11/2010 | Kim ........................ G06F 21/10 726/28 |
| 2012/0124675 A1* | 5/2012 | Lee ........................ G06F 21/10 726/28 |
| 2012/0221857 A1 | 8/2012 | Shukla et al. |
| 2014/0052982 A1 | 2/2014 | Ackerly |

* cited by examiner

METHODS AND SYSTEMS FOR ENFORCING, BY A KERNEL DRIVER, A USAGE RESTRICTION ASSOCIATED WITH ENCRYPTED DATA

CROSS-REFERENCE TO RELATED APPLICATIONS

This application claims priority from U.S. Provisional Patent Application Ser. No. 62/042,968, filed on Aug. 28, 2014, entitled "Methods and Systems for Enforcing, by a Kernel Driver, a Usage Restriction Associated with Encrypted Data," which is hereby incorporated by reference.

BACKGROUND

The disclosure relates to enforcing access control rights associated with encrypted data. More particularly, the methods and systems described herein relate to enforcement, by a kernel driver, of at least one usage restriction associated with encrypted data.

Conventional systems for digital rights management are typically proprietary systems that provide functionality for securing—e.g., via one or more of encrypting, controlling access, or authenticating—shared data objects stored within the system and accessed by users of the system. However, such systems do not typically extend to securing data objects once the data objects are shared with individuals external to the system or for securing data objects created outside the system. Although individuals may implement cryptographic functions without the use of a digital rights management system, such functions typically require a level of technical sophistication unavailable to the average individual. Further, even for sophisticated users, there are a number of well-known drawbacks to standard cryptographic techniques. Compounding the difficulty of secure data transmission, conventional systems typically lack functionality for enforcing access control restrictions associated with secure data once a recipient retrieves the secure data.

BRIEF SUMMARY

A method of providing a restricted set of application programming interfaces includes decrypting, by a secure object information reader executing on a computing device, an encrypted data object using information associated with the encrypted data object to generate a decrypted data object, the information received from an access control management system. The method includes intercepting, by a kernel driver executing on the computing device, from a process executing on the computing device, a request to access the decrypted data object. The method includes identifying, by the kernel driver, using the information associated with the encrypted data object, a usage requirement restricting a set of operations available to the process in accessing the decrypted data object. The method includes providing, by the kernel driver, to the process, a restricted set of application programming interfaces with which to interact with the decrypted data object, as permitted by the restricted set of operations.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein relate to enforcement, by a kernel driver, of at least one usage restriction associated with encrypted data. Before describing such methods and systems in detail, however, a description is provided of a network in which such methods and systems may be implemented.

Figure 1A:
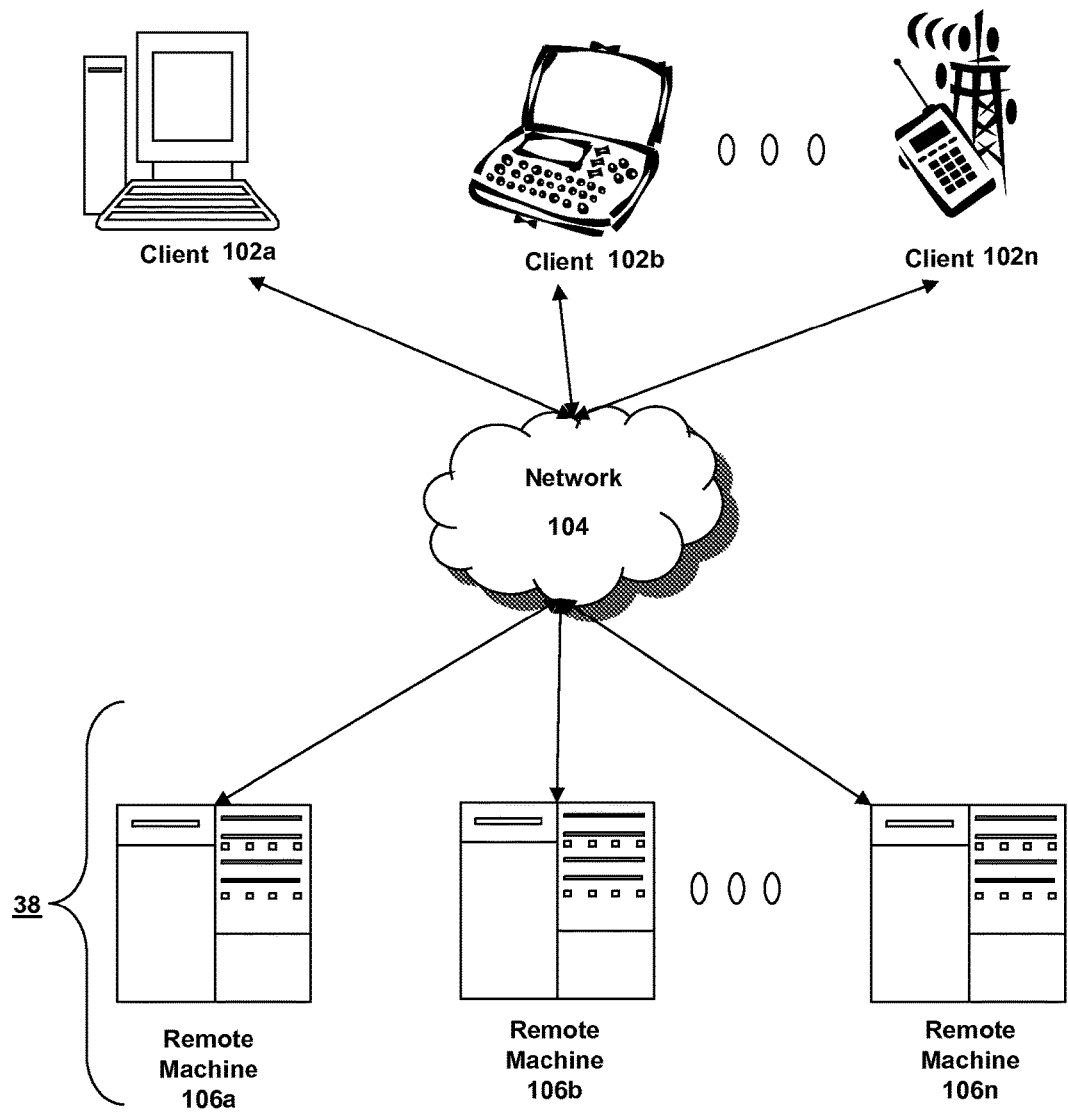
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein.

A client 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 102.

In one embodiment, a remote machine 106 provides the functionality of a web server.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
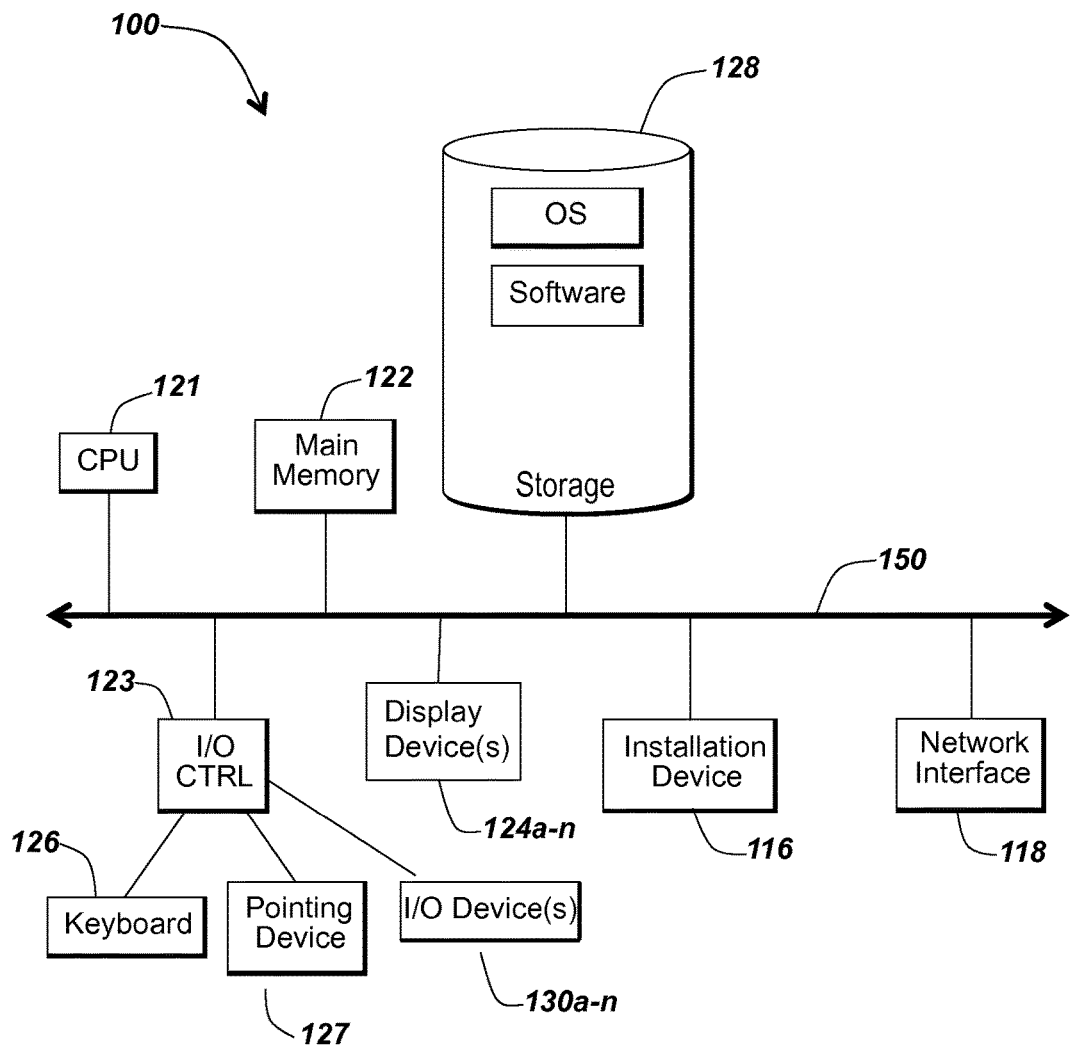
Figure 1C:
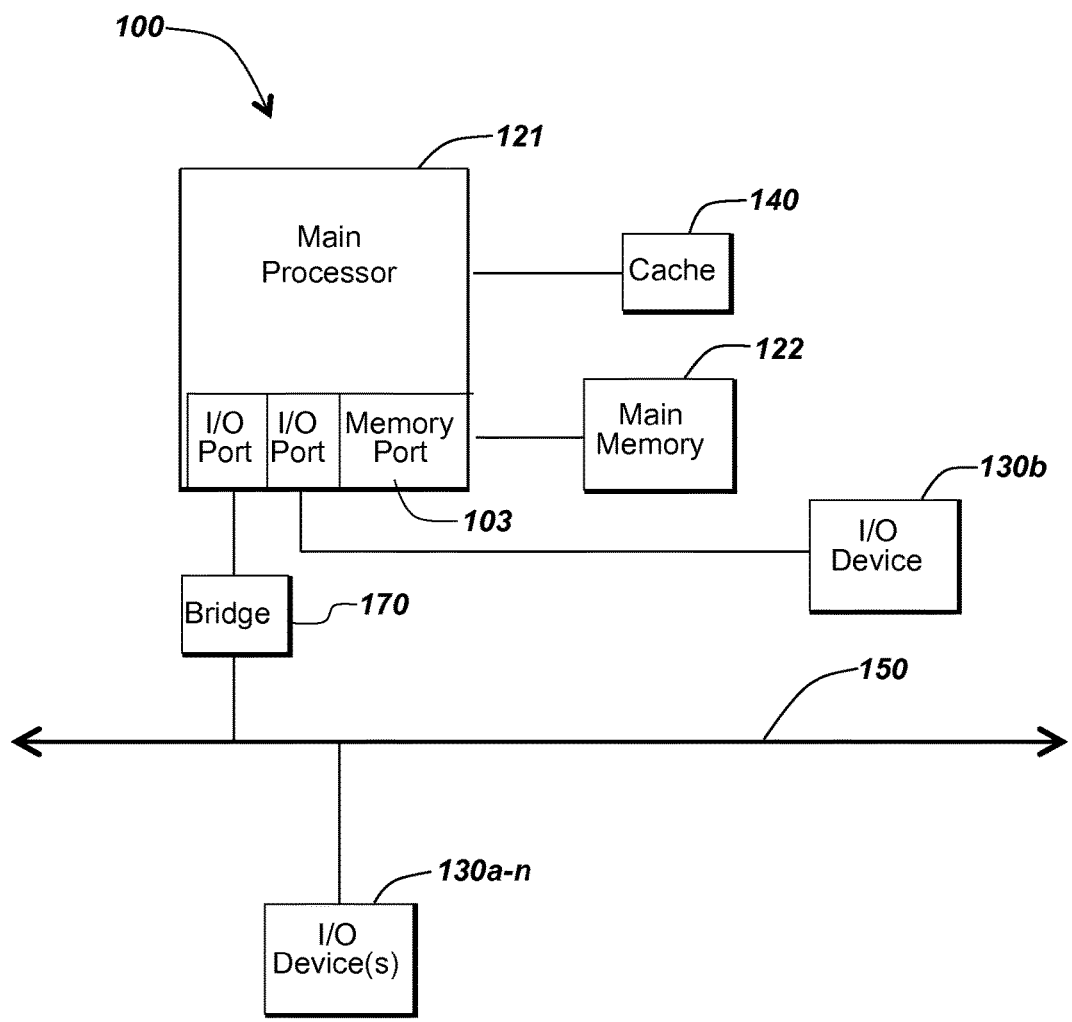

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124*a-n*, a keyboard 126, a pointing device 127, such as a mouse, and one or more other I/O devices 130*a-n*. The storage device 128 may include, without limitation, an operating system and software. As shown in FIG. 1C, each computing device 100 may also include additional optional elements, such as a memory port 103, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130*b* via, for example, HYPERTRANSPORT, RAPIDIO, or INFINIBAND communications technology.

A wide variety of I/O devices 130*a*-130*n* may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 100 may provide functionality for installing software over a network 104. The computing device 100 may further comprise a storage device, such as one or more hard disk drives or redundant arrays of independent disks, for storing an operating system and other software. Alternatively, the computing device 100 may rely on memory chips for storage instead of hard disks.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, BLUETOOTH, ZIGBEE, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; LINUX, a freely-available operating system distributed by Caldera Corp. of Salt Lake City, Utah; Red Hat Enterprise LINUX, a Linus-variant operating system distributed by Red Hat, Inc. of Raleigh, N.C.; Ubuntu, a freely-available operating system distributed by Canonical Ltd. of London, England; or any type and/or form of a UNIX operating system, among others.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone/Smartphone or personal digital assistant (PDA). The computing device 100 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smart phone, Pocket PC, Pocket PC Phone, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices manufactured by Apple Inc. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Google/Motorola line of combination digital audio players and mobile phones. In another of these embodiments, the computing device 100 is a device in the iPhone smartphone line of devices manufactured by Apple Inc. In still another of these embodiments, the computing device 100 is a device executing the Android open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the iPad line of devices manufactured by Apple Inc.; the PlayBook manufactured by Research In Motion; the Cruz line of devices manufactured by Velocity Micro, Inc. of Richmond, Va.; the Folio and Thrive line of devices manufactured by Toshiba America Information Systems, Inc. of Irvine, Calif.; the Galaxy line of devices manufactured by Samsung; the HP Slate line of devices manufactured by Hewlett-Packard; and the Streak line of devices manufactured by Dell, Inc. of Round Rock, Tex.

Some embodiments of the disclosed system and method involve the use of cryptographic systems. A cryptographic system is a set of protocols or algorithms whereby a data set, known as "plaintext," which is coherent in a particular format readable for a person or machine, is converted to a related data set, known as "cyphertext," which is typically not coherent for any person or machine unless first converted back into plaintext. The plaintext may be any set of data that may be stored or interpreted by computing devices 100 as described above in reference to FIGS. 1A-1C. The plaintext may be a character array, such as a string of human-readable symbols. The plaintext may be an image file, such as a Joint Photographic Experts Group ("JPEG") file. The plaintext may be an audio file, such as a Moving Pictures Experts Group—Audio Layer III ("MP3") file. The plaintext may be a video file, such as a Moving Pictures Experts Group ("MPEG") file. The cryptographic system may translate the plaintext into cyphertext by performing one or more mathematical operations on the plaintext. The process of converting plaintext into cyphertext is known as "encryption." The cyphertext may be referred to as "encrypted." The cryptographic system may use another dataset called an "encryption key" to encrypt the plaintext. In one embodiment, an encryption key is any data that enables a cryptographic system to encrypt plaintext into cyphertext. In some embodiments, the cryptographic system also includes a protocol for converting cyphertext back into plaintext. The process of converting the cyphertext back into plaintext may be called "decryption." A "decryption key" is any data that enables a cryptographic system to decrypt cyphertext, producing its corresponding plaintext.

In some cryptographic systems, known as "symmetric" cryptographic systems, the decryption key is sufficiently similar to the encryption key that possession of either the decryption key or the encryption key enables a computing device 100 to determine the encryption key or the decryption key, respectively. The encryption and decryption keys in symmetric cryptographic systems may be kept secret, and shared only with persons or entities that the user of the cryptographic system wishes to be able to decrypt the cyphertext. One example of a symmetric cryptographic system is AES, which arranges plaintext into matrices and then modifies the matrices through repeated permutations and arithmetic operations with an encryption key. In embodiments of cryptographic systems that are "asymmetric," neither the encryption key nor the decryption key can be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number that is the product of two very large prime numbers.

Embodiments of the disclosed system and method provide functionality for enforcement, by a kernel driver, of at least one usage restriction associated with encrypted data. In some embodiments, when a computing device 100 receives an encrypted data object, the computing device 100 also receives at least one usage restriction that controls the ways in which the computing device 100 may manipulate the encrypted data object. In one of these embodiments, the computing device 100 provides a formal, remote attestation confirming that the computing device 100 will enforce the at least one usage restriction. In another of these embodiments, the computing device 100 need not provide a formal, remote attestation but the sender of the encrypted data object still expects the computing device 100 to enforce the at least one usage restriction. In other embodiments of the methods and systems described herein, the computing device 100 executes functionality for enforcing the at least one usage restriction. In still other embodiments, the computing device 100 executes functionality for limiting functionality provided by one or more processes executing on the computing device 100 in order to enforce the at least one usage restriction.

Figure 2A:
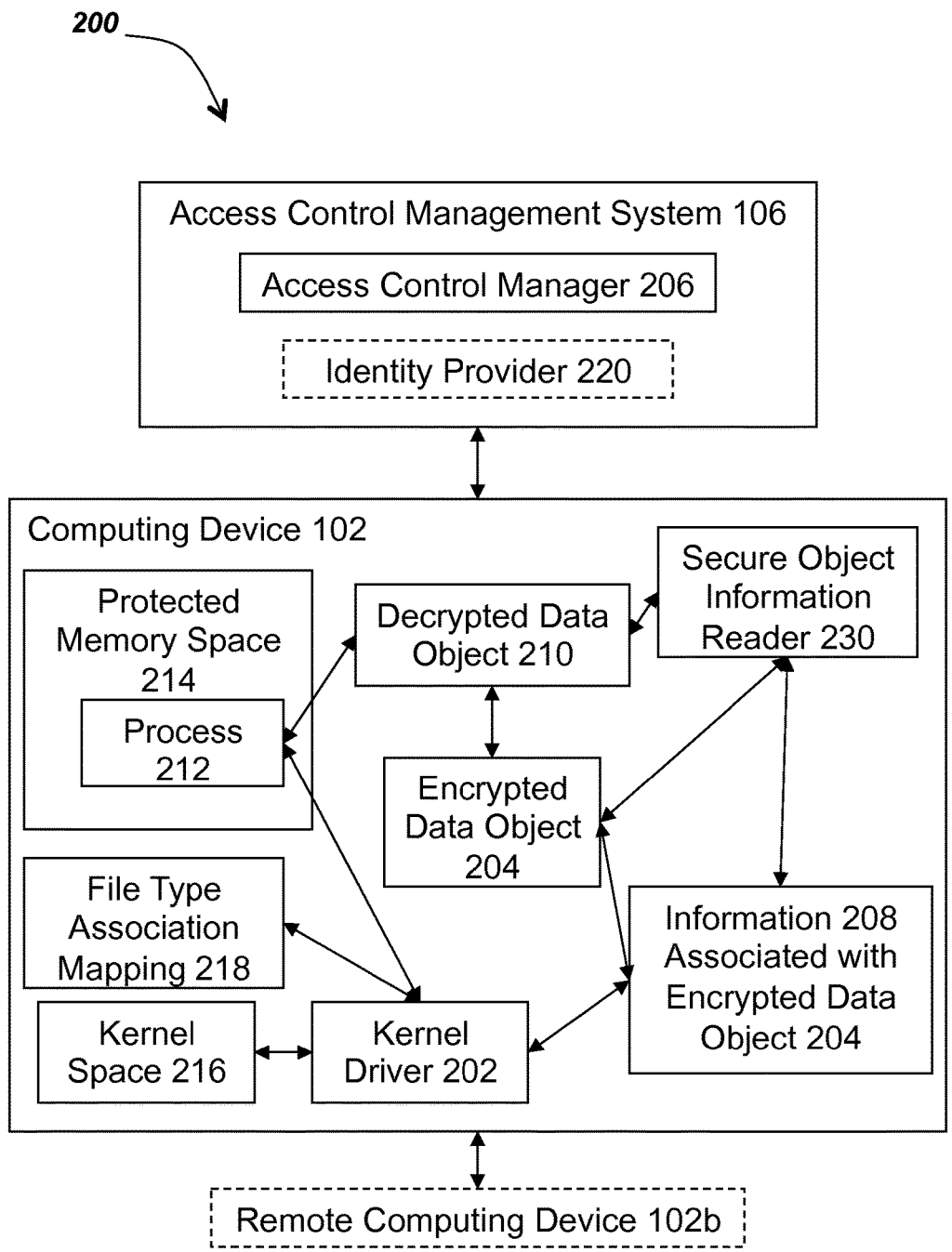
FIG. 2A is a block diagram depicting one embodiment of a system for enforcement, by a kernel driver, of at least one access control restriction associated with encrypted data.

Referring now to FIG. 2A, a block diagram depicts one embodiment of a system 200 for enforcement, by a kernel driver, of at least one usage restriction associated with encrypted data. In brief overview, the system 200 includes a computing device 102. The computing device 102 may be a computing device 102 as described above in reference to FIGS. 1A-1C. The system 200 includes a kernel driver 202, an encrypted data object 204, an access control manager 206, information 208 associated with the encrypted data object 204, a decrypted data object 210, a process 212, protected memory space 214, kernel space 216, and a file type association mapping 218. The kernel driver 202 may be any process, application, or code that provides the functionality described herein regarding the ability to launch a process in a protected environment and control the APIs or portions of APIs that are available to the process. The system includes an access control management system 106, which provides an access control manager 206. The access control management system 106 may provide an identity provider 220, depicted in shadow in FIG. 2A. In some embodiments, the system includes a secure object information reader 230.

In one embodiment, the computing device 102 receives an encrypted data object 204. For example, the computing device may receive the encrypted data object 204 from a remote computing device 102b (depicted in shadow in FIG. 2A). In some embodiments, the encrypted data object 204 is an encrypted data object as described in commonly-owned, co-pending U.S. patent application Ser. No. 14/489,604, titled "Methods and Systems for Distributing Cryptographic Data to Trusted Recipients," which is incorporated by reference herein. For example, the remote computing device 102b may execute a secure object information generator 230 that processes a data object to generate an encrypted data object 204 and information 208 associated with the encrypted data object 204.

In some embodiments, the computing device 102 communicates with the access control manager 206 to receive information 208 for decrypting a received encrypted data object 204. In some embodiments, a secure object information reader 230 communicates with the access control manager 206 to receive the information 208. In some embodiments, and as described in further detail in commonly-owned, co-pending U.S. patent application Ser. No. 14/489,604, titled "Methods and Systems for Distributing Cryptographic Data to Trusted Recipients," the secure object information reader 230 allows a user to access information 208; for example, the secure object information reader 230 may include functionality allowing a user to communicate with the access control management system 206 and the identity provider 220 to authenticate herself in order to receive information 208. In other embodiments, the secure object information reader 230 includes at least one encryption engine for encrypting or decrypting data objects. The secure object information reader 230 may be provided as an application plug-in, a web service, or as a stand-alone application. In other embodiments, the kernel driver 202 includes functionality for receiving the information 208 associated with the encrypted data object 204.

The access control manager 206 may execute on the access control management system 106. The access control manager 206 may be a software program. The access control manager 206 may be a hardware module. In one embodiment, the access control management system 106 is a system that prevents entities from using resources in ways not authorized by the access control manager 206. The access control manager 206 may enforce protocols regarding the cryptographic system. In some embodiments, the access control manager 206 provides decryption information to the computing device 102. The decryption information may be any information that enables the computing device 102 to decrypt the encrypted data object 204. Decryption information may be a decryption key of the cryptographic system used to encrypt the encrypted data object 204.

Some embodiments of the system 200 include an identity provider 220. The identity provider 220 may execute on the same access control management system 106 as the access control manager 206. The identity provider 220 may be integrated into the access control management system 106. In some embodiments, the identity provider 220 executes on a different remote machine 106*b* (not shown). The identity provider 220 may be a software program. The identity provider 220 may be a hardware module. In some embodiments, the identity provider 220 authenticates a user attempting to request decryption of the encrypted portion and confirms that authentication to the access control manager 206. The identity provider 220 may be a service, such as an email service, with which the user has an account. Upon authentication of the user, the identity provider 220 may provide data indicating that the user has been authenticated; for instance, the identity provider may provide an access token, such as a Security Assertion Markup Language ("SAML") token, to the access control manager 206.

In some embodiments, the access control manager 206 supports Role-Based Access Control ("RBAC"). RBAC is an existing access control framework in which access to files is controlled by virtue of the roles a user has been assigned rather than the user's personal identity. In some embodiments, the information 208 includes identified properties or roles, and the access control manager 206 determines whether to send decryption information based on whether a user has an authorized property or role.

The system 200 may provide functionality allowing the computing device 102 to authenticate a user of the computing device 102 to the access control manager 206, directly or indirectly, before receiving the information 208 associated with the encrypted data object 204. For example, the system 200 may provide functionality for executing methods described in commonly-owned, co-pending U.S. patent application Ser. No. 14/489,604, titled "Methods and Systems for Distributing Cryptographic Data to Trusted Recipients." As another example, the access control management system 106 may provide functionality for receiving, from the computing device 102*b*, information associated with an encrypted data object; receiving, by the access control management system, from a second client device 102, a request for the information associated with the encrypted data object; verifying, by the access control management system, that a user of the second client device 102 is identified in the received information associated with the encrypted data object; authenticating, by the access control management system, with an identity provider, the user of the second client device; and sending, by the access control management system, to the second client device, the received information associated with the encrypted data object. In some embodiments, the access control manager 206 receives the request for the information 208 from the kernel driver 202. In other embodiments, the access control manager 206 receives the request from the secure object information reader 230.

The information 208 depicted in FIG. 2A may, in some embodiments, be the same type of information 208 as described in commonly-owned, co-pending U.S. patent application Ser. No. 14/489,604, titled "Methods and Systems for Distributing Cryptographic Data to Trusted Recipients." For example, the information 208 may be a registration payload containing information such as an encryption key used to encrypt the data object and an access control list specifying users who may receive the encryption key to decrypt the data object. The information 208 depicted in FIG. 2A may further include at least one usage restriction to be enforced when interacting with the decrypted data object 210. Such usage restrictions may include, without limitation, indications as to whether the decrypted data object 210 is permitted to be copied, pasted, forwarded by email or otherwise distributed to other unauthorized recipients, printed and/or screen-printed with or without embedding hidden "watermarks" in the data object, and any other functions that the system is able to prohibit when the decrypted data object 210 is accessed by an authorized user. For example, the user of the remote computing device 102*b* may prevent "print screen" by applications executing in operating systems that otherwise support the print screen function; if the user generating the encrypted data object 204 wishes to prevent print screen, instructions to enforce such a usage restriction can be included in the information 208. The methods and systems described herein may provide functionality for enforcing these usage restrictions.

In one embodiment, the kernel driver 202 is a filter driver. In another embodiment, the kernel driver 202 is a mini-filter. In still another embodiment, the kernel driver provides functionality for intercepting requests directed to a file system provided by the operating system on the computing device 102. As will be understood by those of ordinary skill in the art, an operating system executing on the computing device 102 allows processes to execute in either "kernel mode" or "user mode," each of the modes having access to different portions of memory in main memory 122 ("kernel space" and "user space," respectively) and each of the modes allowing processes different levels of permission for interacting with the various physical and virtual resources provided by the computing device 102. In one embodiment, the kernel driver 202 executes in kernel mode and has access to kernel space 216. In another embodiments, other processes, such as the secure object information reader 230 or the process 212, execute in user mode and have reduced privileges compared to processes executing in kernel mode. In still another embodiment, the process 212 executes in user mode and accesses a protected memory space 214, which may be protected space within kernel space or within user space.

In one embodiment, the kernel driver 202 is a modified version of a conventional driver. For example, one of ordinary skill in the art would understand how to modify code associated with or comprising a conventional driver to extend the functionality of the driver to provide the functionality described herein. In another embodiment, the kernel driver 202 is a new driver, not based on an existing type of driver. Functionality of the kernel driver 202 may include, for example, and without limitation, the ability to analyze an intercepted file system request (e.g., to open a file), access a table or file type mapping or other data structure to identify a type of process capable of handling the file system request, and launching a process 212 of the identified type into protected memory space 214. As another example, functionality of the kernel driver 202 may include the ability to intercept a request from a process 212 launched into protected memory space 214, access the information 208, and determine whether the intercepted request satisfies a usage restriction included in the information 208. As a further example, functionality of the kernel driver 202 may include the ability to determine that an intercepted request satisfies a usage restriction included in the information 208 and make an application programming interface (API) available to the process 212 with which the process 212 may execute the intercepted request. In some embodiments, a user of the computing device 102 downloads and installs the kernel driver 202 in order to interact with the decrypted data object 210. In other embodiments, the secure object information reader 230 downloads and installs the kernel driver 202 in conjunction with downloading the information 208.

In one embodiment, the process 212 is any process executing on the computing device 102 and requesting permission to interact with the decrypted data object 210. Interactions may include, without limitation, opening a file, reading a file, modifying a file, saving a modification to a file, saving a copy of a file, printing a file, or any other type of interaction with a file.

The system 200 may include a file type association mapping 218. In one embodiment, the kernel driver 202 accesses the file type association mapping 218 to identify a type of process that should execute to handle a user request (e.g., an application that should open a file, print a file, or provide a user of the computing device 102 with functionality for interacting with a decrypted data object 210). As will be well understood by those of ordinary skill in the art, a file type association mapping is a data structure that stores an association between a portion of a file name of a file (e.g., the last four characters, such as .pdf or .doc) and an application (e.g., executable program or other process) with which a user may interact with the file (e.g., ADOBE ACROBAT or MICROSOFT WORD).

Figure 3A:
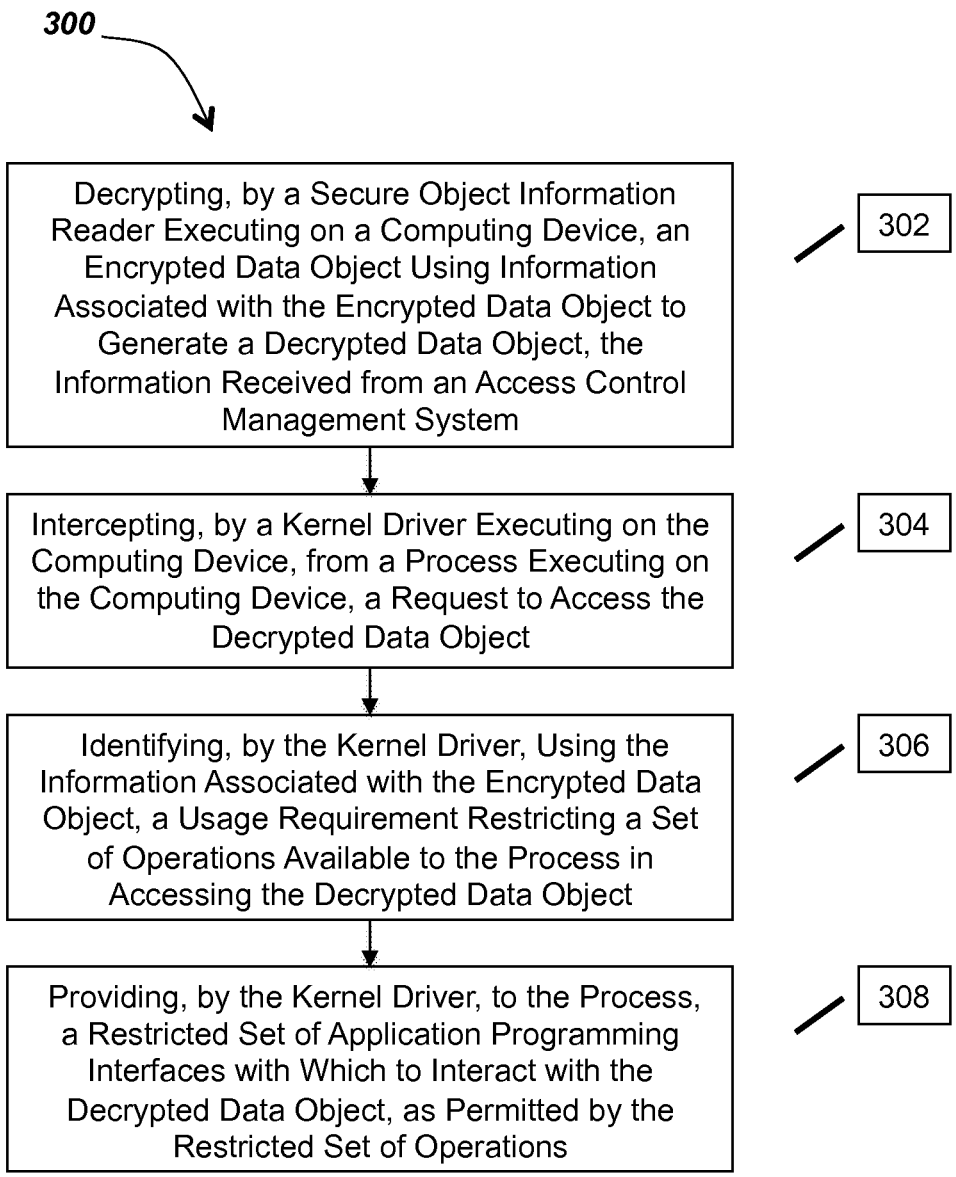
FIG. 3A is a flow diagram depicting an embodiment of a method for providing, by a kernel driver, a process with a restricted set of application programming interfaces with which to interact with a decrypted data object.

Referring now to FIG. 3A, and in connection with FIG. 2A, a flow diagram depicts one embodiment of a method 300 for providing a restricted set of application programming interfaces with which to interact with the decrypted data object. The method 300 includes decrypting, by a secure object information reader executing on a computing device, an encrypted data object using information associated with the encrypted data object, the information received from an access control management system (302). The method 300 includes intercepting, by a kernel driver executing on the computing device, from a process executing on the computing device, a request to access the decrypted data object (304). The method 300 includes identifying, by the kernel driver, using the information associated with the encrypted data object, a usage requirement restricting a set of operations available to the process in accessing the decrypted data object (306). The method 300 includes providing, by the kernel driver, to the process, a restricted set of application programming interfaces with which to interact with the decrypted data object, as permitted by the restricted set of operations (308).

The method 300 includes decrypting, by a secure object information reader executing on a computing device, an encrypted data object using information associated with the encrypted data object, the information received from an access control management system (302). In some embodiments, the secure object information reader 230 decrypts the encrypted data object 204 using the information 208, which includes a cryptographic key for decrypting the encrypted data object 204. Decryption of the encrypted data object 204 may result in generation of the decrypted data object 210. In other embodiments, the encrypted data object 204 is decrypted as described in commonly-owned, co-pending U.S. patent application Ser. No. 14/489,604, titled "Methods and Systems for Distributing Cryptographic Data to Trusted Recipients." Alternatively, the kernel driver 202 includes functionality for decrypting the encrypted data object 204. In further embodiments, the encrypted data object 204 is decrypted using conventional means for decrypting data objects. Once decrypted, the decrypted data object 210 is stored in memory, which may be, for example, protected memory space 214.

The method 300 includes intercepting, by a kernel driver executing on the computing device, from a process executing on the computing device, a request to access the decrypted data object (304). In one embodiment, a user of the computing device 102 generates an instruction to open the decrypted data object 210 (e.g., using a mouse or other pointing device to double-click on a graphical icon of the decrypted data object 210 displayed to the user within a graphical user interface, the double-clicking action generating the instruction); an operating system executing on the computing device 102 may determine the type of process 212 capable of interacting with the decrypted data object 210 (e.g., by accessing the file type association mapping 218), launches the process 212, and then the process 212 issues a request to a file system of the operating system for access to the decrypted data object 210, which the kernel driver 202 intercepts. Alternatively, the user of the computing device 102 may generate the instruction to open the decrypted data object 210 and the kernel driver 202 intercepts the instruction before the operating system receives the instruction; the kernel driver 202 may then identify the type of process 212 (e.g., by accessing the file type association mapping 218) and determine whether or not the user is authorized to open the decrypted data object 210 based upon data within the information 208. Thus, the kernel driver 202 may intercept the request for access (e.g., the instruction to open the decrypted data object 210) directly upon user generation of the request or indirectly upon generation of the request by a process identified by the operating system. As another example, the kernel driver 202 intercepts instructions from any process to open any decrypted data object 210 on the computing device 102 (including any operating system process seeking to launch an application). In another embodiment, the kernel driver 202 intercepts any instructions from any process to modify or manipulate the decrypted data object 210 in any way (e.g., not just instructions to open the decrypted data object 210 but any calls to a file system, such as requests to save a copy of the decrypted data object 210, requests for access to a printer driver for printing the decrypted data object 210, etc.).

The method 300 includes identifying, by the kernel driver, using the information associated with the encrypted data object, a usage requirement restricting a set of operations available to the process in accessing the decrypted data object (306). In one embodiment, the kernel driver 202 analyzes at least one usage requirement retrieved from the information 208 to identify which operations the at least one usage requirement specifies the user is authorized to execute. The methods and systems described herein allow users encrypting data objects to specify at a granular level what type of access authorized users are allowed. For example, an encrypting user may indicate that authorized users should be able to read the decrypted data but not to modify or otherwise manipulate the data object (e.g., a user may be authorized to read a WORD document without having authorization to modify the document, save changes, print the document, print the document without a watermark, or otherwise manipulate the document). Such usage restrictions may be included in the information 208 along with other information associated with the encrypted data object, such as decryption keys.

Figure 2B:
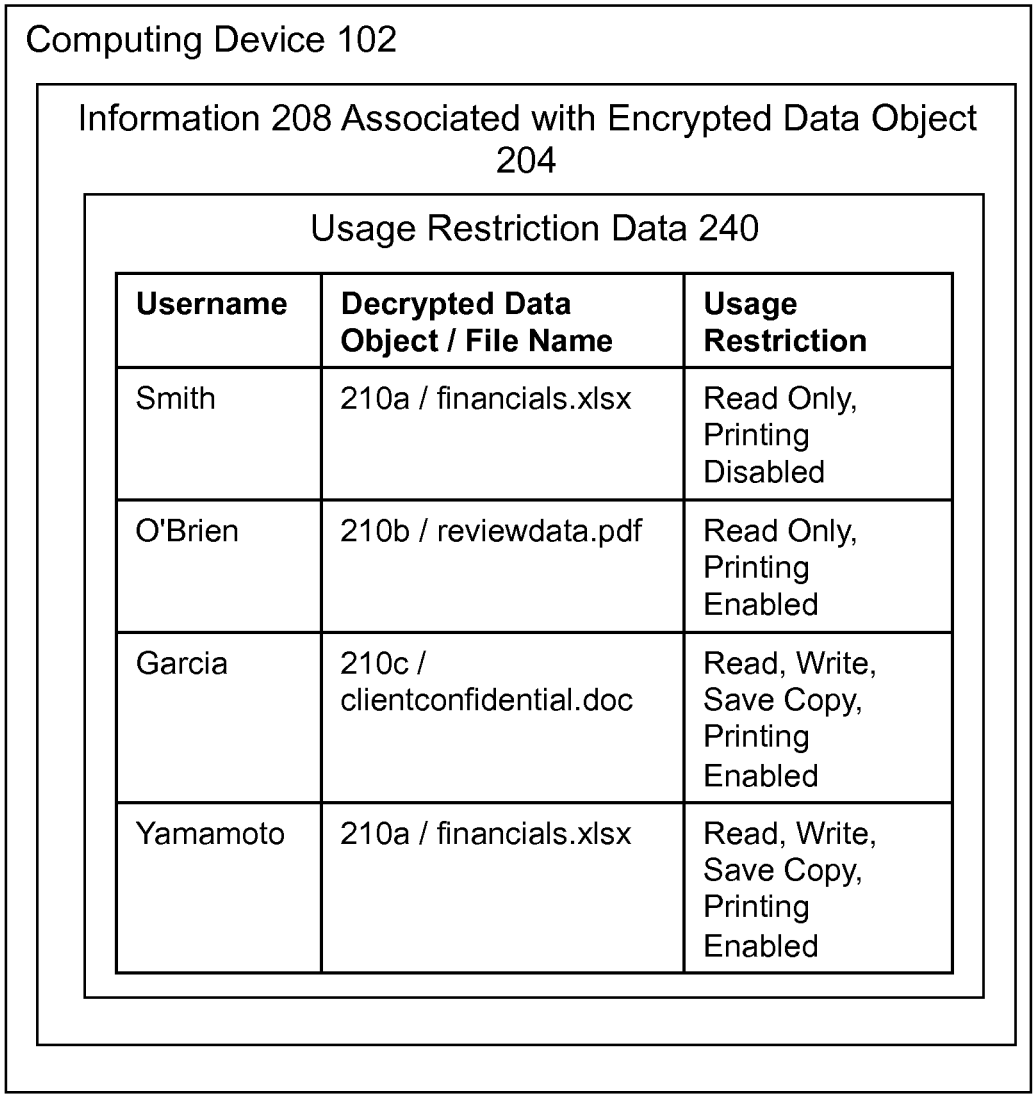
FIG. 2B is a block diagram depicting one embodiment of usage restriction data within information associated with an encrypted data object.

Referring now to FIG. 2B, a block diagram depicts one embodiment of the usage restriction data within information associated with an encrypted data object. As shown in FIG. 2B, a usage restriction may include an identification of an authorized user. The usage restriction may include an identification of the decrypted data object 210. The usage restriction may include one or more identifications of a type access that is authorized. The usage restriction may include one or more identifications of a type access that is unauthorized. By way of example, and as shown in FIG. 2B, usage restriction data 240 may indicate that a user having a username of Smith is authorized to read a decrypted data object 210a having a file name of "financials.xlsx," but is not authorized to print the decrypted data object 210a. As another example, and as shown in FIG. 2B, usage restriction data 240 may indicate that a user having a username of O'Brien is authorized to read a decrypted data object 210a having a file name of "reviewdata.pdf," and is authorized to print the decrypted data object 210a. As a further example, and as shown in FIG. 2B, usage restriction data 240 may indicate that a user having a username of Garcia is authorized to read, write, save a copy of, and print a decrypted data object 210a having a file name of "clientconfidential.doc." As still another example, and as shown in FIG. 2B, usage restriction data 240 may indicate that a user having a username of Yamamoto is authorized to read, write, save a copy of, and print a decrypted data object 210a having a file name of "financials.xlsx," illustrating that different users may have different privileges for interacting with the same decrypted data object since the user with the username of Smith is only allowed to read the document. Usage restriction data 240 may also indicate time periods during which users are authorized to interact with decrypted data objects. For example, if an authorized user attempts to interact with a decrypted data object 210 at a time at which the usage restriction data 240 indicates authorization has expired, the kernel driver 202 may prevent the interaction. Similarly, if the usage restriction data 240 is updated (e.g., through downloading of updated information 208) and indicates a previously-authorized user is no longer authorized for a particular type of interaction, the kernel driver may kill the process 212 to prevent any further interaction of the identified type. These non-limiting examples indicate that the user encrypting a data object may provide granular instructions as to how a user is authorized to interact with a decrypted data object 210.

In one embodiment, the usage restrictions are not human-readable text as shown in FIG. 2B (e.g., "print enabled") but are instructions to the kernel driver 202 in any form the kernel driver 202 can process. In another embodiment, the usage restrictions specify restrictions to be placed on an application or other process providing access to the specified decrypted data object. Unlike conventional methods for restricting access rights associated with a data object, the usage restriction data described herein restricts the right of the application to access an interface for providing functionality. By way of example, instead of stating, "printing disabled," a usage restriction may identify a name of an API for accessing a printer driver and indicate that the kernel driver 202 should remove that API from a process that would otherwise have the API. Although FIG. 2B depicts usage restriction data 240 as explicitly listing usages that are enabled or disabled, the usage restriction data 240 may follow a format in which only enabled usages are listed and all other usages are presumed to be disabled, or vice versa. Implementation of such methods and systems provides an enforcement system that focuses on the underlying format of a data object and on restricting functionality of a process (e.g., application) capable of interacting with data objects having the underlying format.

Referring back to FIG. 3A, the method 300 includes providing, by the kernel driver, to the process, a restricted set of application programming interfaces (APIs) with which to interact with the decrypted data object, as permitted by the restricted set of operations (308). In some embodiments of methods and systems described herein, instead of merely restricting usage of application functionality for a particular data object a user seeks to manipulate, the system 200 enables modification of the application itself. In contrast with other technologies, which may restrict whether a particular feature is available for access to a particular data object (e.g., allowing one document to print but preventing another from printing), implementation of the methods and systems described herein result in a modified version of the application, which is missing any functionality that might be restricted for a data object (e.g., the print function is not simply disabled for one data object but the API with which a process might request a print job is completely removed from the process). Modifying the functionality of the process that will provide access to the data object allows the computing device 102 to enforce usage restrictions. The kernel driver may decide to remove functionality from an API before providing access to the API. The kernel driver may decide to authorize normal access to an unmodified API. The kernel driver may decide to provide access to a substitute API.

In one embodiment and as will be described in greater detail below, the kernel driver 202 provides the restricted set of APIs by launching the process 212 into a protected memory space 214, intercepting each call made by the process 212 (e.g., each instruction transmitted to the operating system and requiring a type of permission), determining whether the call is authorized based on an analysis of the at least one usage requirement, and providing the appropriate API or blocking the call.

Figure 3B:
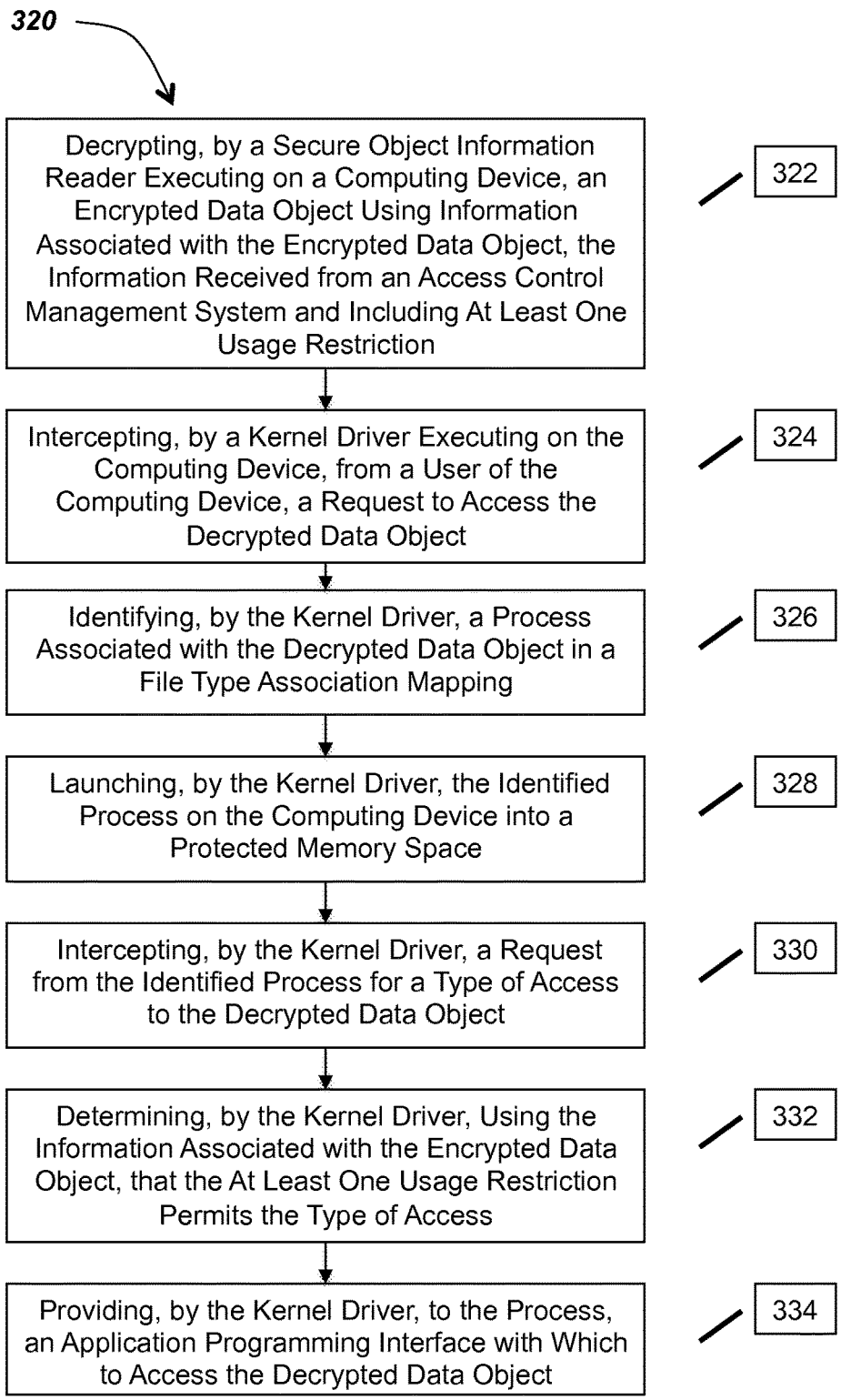
FIG. 3B is a flow diagram depicting an embodiment of a method for enforcement, by a kernel driver, of at least one usage restriction associated with encrypted data.

Referring now to FIG. 3B, and in connection with FIGS. 2A-2B and 3A, a flow diagram depicts an embodiment of a method 320 for enforcement, by a kernel driver, of at least one usage restriction associated with encrypted data. The method 320 includes decrypting, by a secure object information reader executing on a computing device, an encrypted data object using information associated with the encrypted data object, the information received from an access control management system and including at least one usage restriction (322). The method 320 includes intercepting, by a kernel driver executing on the computing device, from a user of the computing device, a request to access the decrypted data object (324). The method 320 includes identifying, by the kernel driver, a process associated with the decrypted data object in a file type association mapping (326). The method 320 includes launching, by the kernel driver, the identified process on the computing device into a protected memory space (328). The method 320 includes intercepting, by the kernel driver, a request from the identified process for a type of access to the decrypted data object (330). The method 320 includes determining, by the kernel driver, using the information associated with the encrypted data object, that the at least one usage restriction permits the type of access (332). The method 320 includes providing, by the kernel driver, to the process, an application programming interface with which to access the decrypted data object (334). In one embodiment, method 320 provides one way in which the kernel driver 202 may provide a process with a restricted set of APIs with which to interact with a decrypted data object 210.

The method 320 includes decrypting, by a secure object information reader executing on a computing device, an encrypted data object using information associated with the encrypted data object, the information received from an access control management system and including at least one usage restriction (322). In one embodiment, the decryption occurs as described above in connection with FIG. 3A, (302).

The method 320 includes intercepting, by a kernel driver executing on the computing device, from a user of the computing device, a request to access the decrypted data object (324). In one embodiment, the kernel driver 202 intercepts the request as described above in connection with FIG. 3A, (304).

The method 320 includes identifying, by the kernel driver, a process associated with the decrypted data object in a file type association mapping (326). In one embodiment, the kernel driver 202 accesses a file type association mapping 218 to identify the process 212 (e.g., by retrieving a portion of a filename of the decrypted data object 210 (e.g., ".doc"), searching the file type association mapping 218 for an entry listing the retrieved portion of the filename, and retrieving the associated process name from the entry listing the retrieved portion of the filename.

The method 320 includes launching, by the kernel driver, the identified process on the computing device into a protected memory space (328). In one embodiment, launching the process 212 into the protected memory space 214 provides the kernel driver 202 with additional control over the process 212 and ensures that only certain APIs are available to the process 212 (i.e., the APIs that conform with the at least one usage requirement). In another embodiment, the kernel driver 202 launching the process 212 includes executing the process 212 in a limited mode or otherwise restricting permissions that would typically be available to the process 212.

The method 320 includes intercepting, by the kernel driver, from the identified process, a request for a type of access to the decrypted data object (330). In one embodiment, the kernel driver 202 intercepts the request from the process 212 as described above in connection with FIG. 3A, (304).

The method 320 includes determining, by the kernel driver, using the information associated with the encrypted data object, that the at least one usage restriction permits the type of access (332). In one embodiment, the kernel driver 202 identifies the at least one usage restriction within the information 208 as described above in connection with FIG. 3A, (306) and FIG. 2B. For example, the kernel driver 202 may access the information 208, identify an API that is listed as disabled in the usage restriction, compare the identified API to the API identified in the request for the type of access, and determine whether the two APIs are substantially the same and access should be disabled; conversely, the kernel driver 202 may identify an API that is listed as enabled in the usage restriction and determine whether the enabled API is the substantially the same as the API included in the request.

The method 320 includes providing, by the kernel driver, to the process, an application programming interface with which to access the decrypted data object (334).

Figure 3C:
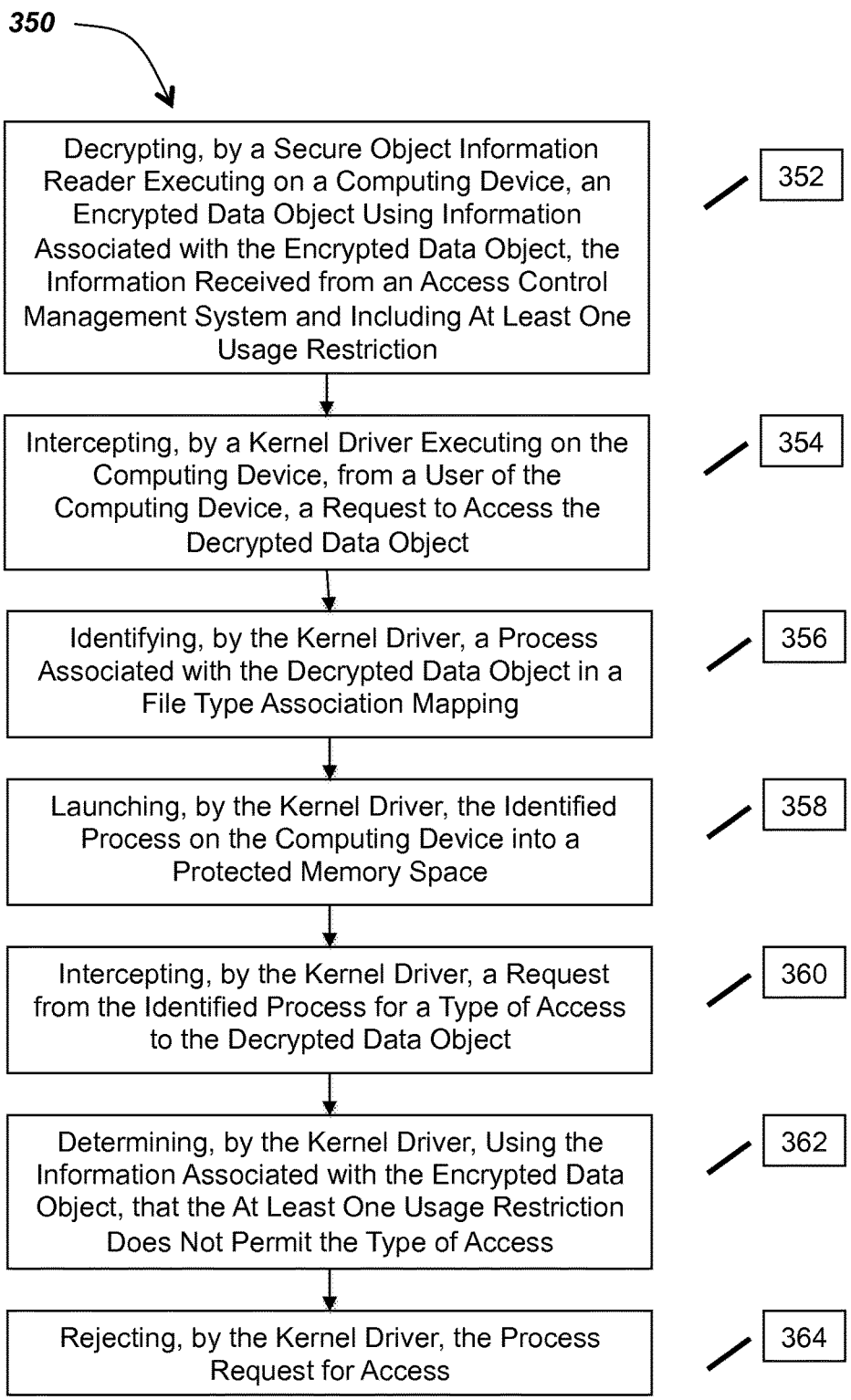
FIG. 3C is a flow diagram depicting an embodiment of a method for enforcement, by a kernel driver, of at least one usage restriction associated with encrypted data.

Referring now to FIG. 3C, a flow diagram depicts an embodiment of a method 350 for enforcement, by a kernel driver, of at least one usage restriction associated with encrypted data. The method 350 includes decrypting, by a secure object information reader executing on a computing device, an encrypted data object using information associated with the encrypted data object, the information received from an access control management system and including at least one usage restriction (352). In one embodiment, the decryption occurs as described above in connection with FIG. 3B, (322). The method 350 includes intercepting, by a kernel driver executing on the computing device, from a user of the computing device, a request to access the decrypted data object (354). In one embodiment, the interception occurs as described above in connection with FIG. 3B, (324). The method 350 includes identifying, by the kernel driver, a process associated with the decrypted data object in a file type association mapping (356). In one embodiment, the identifying occurs as described above in connection with FIG. 3B, (326). The method 350 includes launching, by the kernel driver, the identified process on the computing device into a protected memory space (358). In one embodiment, the launching occurs as described above in connection with FIG. 3B, (328). The method 350 includes intercepting, by the kernel driver, a request from the identified process for a type of access to the decrypted data object (360). In one embodiment, the interception occurs as described above in connection with FIG. 3B, (330). The method 350 includes determining, by the kernel driver, using the information associated with the encrypted data object, that the at least one usage restriction does not permit the type of access (362). In one embodiment, the determining occurs as described above in connection with FIG. 3B, (332). The method 350 includes rejecting, by the kernel driver, the process request for access (364). In one embodiment, the kernel driver 202 transmits an indication to the process 212 that the kernel driver 202 has denied the request. In another embodiment, the kernel driver 202 transmits an indication to the process 212 that the user is not authorized to interact with the decrypted data object 210 in the requested way. In still another embodiment, the process 212 indicates to the user that the user lacked authorization to complete the requested interaction.

In some embodiments, the kernel driver 202 establishes a shadow file system (not shown) to ensure that contents of the decrypted data object 210 are not inappropriately (e.g., in an unauthorized manner) exported. One of ordinary skill in the art will understand that conventional shadow file systems were created for allowing virtual machines to undo ("roll back") changes made resulting in one state or configuration to a second state or configuration as identified by a state snapshot. Creation of a snapshot of the shadow file system allows the kernel driver 202 to enforce usage restrictions at an even more granular level. If the process 212 only allows the user to read the decrypted data object 210, no changes are made to the shadow file system and the shadow file system can be discarded after the user completes interaction with the decrypted data object 210 (e.g., issues an instruction to close the file or to close the process 212). In some embodiments, if a user of the computing device 102 is authorized to modify the decrypted data object 210 or otherwise generate derivative data objects, the kernel driver 202 may intercept a request to modify the decrypted data object 210 (e.g., an instruction to modify the decrypted data object or to generate a derivative data object) as described above and then implement the modification in either the decrypted data object 210 stored within the actual file system of the computing device 102 or generate the derivative data object within the actual file system. In one of these embodiments, the kernel driver 202 may re-encrypt the modified data object or encrypt the newly generated derivative data object. In other embodiments, however, the user of the computing device 102 is not authorized to modify the decrypted data object 210 or otherwise generate derivative data objects and instead of executing the instruction in the actual file system, the kernel driver 202 implements the request in the shadow file system on, for example, a copy of the decrypted data object 210. When the user has completed interacting with the copy of the decrypted data object 210, the kernel driver 202 may discard the shadow file system without saving any unauthorized modifications.

Embodiments of the above-described system and method permit a computing device to enforce usage restrictions placed upon an encrypted data object by an encrypting party. Such systems and methods may increase a level of trust between parties exchanging encrypted data, increase a likelihood the parties will even share the encrypted data, and provide ease of use for users seeking to interact with the encrypted data.

It should be understood that the systems described above may provide multiple ones of any or each of the described components and these components may be provided on either a standalone machine or, in some embodiments, on multiple machines in a distributed system. The phrases 'in one embodiment,' 'in another embodiment,' and the like, generally mean the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices; firmware; programmable logic; hardware (e.g., integrated circuit chip, electronic devices, a computer-readable non-volatile storage unit, non-volatile memory, such as semiconductor memory devices, including EPROM, EEPROM, and flash memory devices); magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for enforcing, by a kernel driver, at least one usage restriction of an encrypted data object, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method of providing a restricted set of application programming interfaces comprising:

decrypting, by a secure object information reader executing on a computing device, an encrypted data object using information associated with the encrypted data object to generate a decrypted data object, the information received from an access control management system;

intercepting, by a kernel driver executing on the computing device, from a process executing on the computing device, a request to access the decrypted data object;

retrieving, by the kernel driver, from the information received from the access control management system, a usage requirement restricting a set of operations available to the process in accessing the decrypted data object;

identifying, by the kernel driver, in the retrieved usage requirement, an operation a user of the computing device is authorized to execute; and providing, by the kernel driver, to the process, a restricted set of application programming interfaces with which to interact with the decrypted data object, the restricted set including the authorized operation identified in the retrieved usage requirement.

2. A method of providing a restricted set of application programming interfaces comprising:
- decrypting, by a secure object information reader executing on a computing device, an encrypted data object using information associated with the encrypted data object, the information received from an access control management system and including at least one usage restriction;
- intercepting, by a kernel driver executing on the computing device, from a user of the computing device, a request to access the decrypted data object;
- identifying, by the kernel driver, a process associated with the decrypted data object in a file type association mapping;
- launching, by the kernel driver, the identified process on the computing device into a protected memory space;
- intercepting, by the kernel driver, a request from the identified process for a type of access to the decrypted data object;
- retrieving, by the kernel driver, from the information received from the access control management system, the at least one usage requirement;
- identifying, by the kernel driver, in the retrieved at least one usage requirement, an operation a user of the computing device is authorized to execute;
- determining, by the kernel driver, based on the identified authorized operation in the retrieved at least one usage requirement, that the at least one usage restriction permits the type of access requested; and
- providing, by the kernel driver, to the process, an application programming interface with which to access the decrypted data object.

3. A method of providing a restricted set of application programming interfaces comprising:
- decrypting, by a secure object information reader executing on a computing device, an encrypted data object using information associated with the encrypted data object, the information received from an access control management system and including at least one usage restriction;
- intercepting, by a kernel driver executing on the computing device, from a user of the computing device, a request to access the decrypted data object;
- identifying, by the kernel driver, a process associated with the decrypted data object in a file type association mapping;
- launching, by the kernel driver, the identified process on the computing device into a protected memory space;
- intercepting, by the kernel driver, a request from the identified process for a type of access to the decrypted data object;
- retrieving, by the kernel driver, from the information received from the access control management system, the at least one usage requirement;
- determining, by the kernel driver, using the retrieved at least one usage requirement, that the at least one usage restriction does not permit the type of access; and
- rejecting, by the kernel driver, the process request for access.

4. The method of claim 3, further comprising, identifying, by the kernel driver, in the retrieved at least one usage requirement, an operation a user of the computing device is authorized to execute.

* * * * *